United States Patent [19]
Amirsakis et al.

[11] Patent Number: 5,681,919
[45] Date of Patent: Oct. 28, 1997

[54] MAGNETIC RECORDING BINDER CONTAINING AMINOALKYLPHOSPHONATE SALT

[75] Inventors: Charles J. Amirsakis, Lake Geneva, Wis.; David E. Vietti, Cary, Ill.; Daniel P. Heberer, McHenry, Ill.; Louis C. Dolmon, Woodstock, Ill.; Lawrence Picchiotti, Schaumburg, Ill.

[73] Assignee: Morton International, Inc., Chicago, Ill.

[21] Appl. No.: 453,150

[22] Filed: May 30, 1995

Related U.S. Application Data

[62] Division of Ser. No. 238,296, May 5, 1994.

[51] Int. Cl.$^6$ ................................................. C08G 63/692
[52] U.S. Cl. ............................. 528/287; 528/71; 528/72
[58] Field of Search .................................. 528/71, 72, 287

[56] References Cited

U.S. PATENT DOCUMENTS

| | | | |
|---|---|---|---|
| 2,635,112 | 4/1953 | Fields et al. | 558/135 |
| 4,803,230 | 2/1989 | Moroni et al. | 521/168 |
| 5,254,432 | 10/1993 | Aoai | 430/192 |

OTHER PUBLICATIONS

Encyclopedia of Polymer Science; vol. 13; 1988; p. 259.

*Primary Examiner*—Rachel Gorr
*Attorney, Agent, or Firm*—Robert M. Didrick; Gerald K. White

[57] ABSTRACT

A magnetic recording medium is prepared by applying a magnetic coating composition onto a non-magnetic support and curing said composition, said coating composition containing ferromagnetic particles dispersed in a binder comprising a thermoplastic resin selected from the group consisting of polyurethanes and polyester wherein there is chemically bonded to said resin at least one aminoalkylphosphonate represented by the formula:

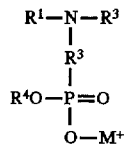

wherein $R^1$ and $R^2$ are the same or different oxyalkyl radicals having from 2 to 12 carbon atoms, $R^3$ is an alkylene radical having from 1 to 12 carbon atoms, or an aralkylene radical having from 7 to 10 carbon atoms $R^4$ is an alkyl radical having from 1 to 12 carbon atoms, a cycloalkyl radical having from 5 to 12 carbon atoms, or an aryl radical having from 6 to 12 carbon atoms wherein the aryl radical may contain a halogen atom, a hydroxyl group, or an amino group, and $M^+$ is a metal ion or an ammonium ion.

4 Claims, No Drawings

MAGNETIC RECORDING BINDER CONTAINING AMINOALKYLPHOSPHONATE SALT

This is a divisional of co-pending application Ser. No. 08/238,296 filed on May 5, 1994.

BACKGROUND OF THE INVENTION

This invention relates to magnetic recording media such as tapes and discs which are obtained by applying a magnetic coating on a non-magnetic support.

General purpose magnetic tapes and discs are produced by coating a polyethylene terephthalate film with a magnetic material prepared by dispersing ferromagnetic particles about 1 micron long in a resinous binder. The resinous binder plays a very important role in providing excellent dispersibility, filling efficiency, and orientation of magnetic particles as well as imparting excellent durability, abrasion resistance, heat resistance and smoothness to the magnetic coating and adhesion thereof to the support.

Examples of resinous binders conventionally used include vinyl chloride/vinyl acetate copolymers, vinyl chloride/vinyl acetate/vinyl alcohol copolymers, vinyl chloride/vinylidene chloride copolymers, polyurethane resins, polyester resins, acrylonitrile/butadiene copolymers, nitrocellulose, cellulose acetate butyrate, epoxy resins, and acrylic resins. Of these resins, conventional polyurethane resins have excellent toughness and abrasion resistance compared to other resins but often are inferior in properties such as blocking resistance, heat resistance, and running stability. For these reasons, a mixed system of polyurethane resins with nitrocellulose or vinyl chloride/vinyl acetate copolymers is often used. The durability, heat resistance, and adhesive properties of polyurethanes may be improved by curing with a polyisocyanate at from about room temperature to about 40° C. or higher after the application and drying of the magnetic coating composition.

A magnetic recording layer having highly improved strength and other properties employs a binder resin comprising both a vinyl chloride copolymer (e.g., a vinyl chloride/vinyl acetate/maleic anhydride copolymer) and a polyurethane resin. Japanese Patent Publication No. 59-8127 teaches the incorporation of a polar group into one or both of the constituent resins to enhance the dispersibility of ferromagnetic powders in such a binder.

The durability and abrasion resistance of conventional resinous binders are still insufficient for use in video tapes, computer tapes, and floppy discs, all of which are required to have high performance and high reliability. Demand for high density and high quality recording media is increasing while smoothness is still desired. As the required smoothness increases, the running durability has suffered and resinous binders with higher durability must be developed. To do so, it has been proposed to introduce multifunctional components into the polyurethanes which are reactive with the polyisocyanate; trimethylolpropane and diethanolamine exemplify such components. A serious drawback to this approach is that the dispersibility of the magnetic particles often decreases as the durability improves. The high recording density and high quality required for magnetic media have been supplied in recent years by fine magnetic particles of metals and barium ferrite but durability and dispersibility are still required of resinous binders for such particles.

A method for improving the dispersibility of the particles by the incorporation of metal sulfonate groups or metal salts of acidic phosphorus compounds is taught in Japanese Patent Publication Nos. 57-3134 and 58-41564 and in Japanese Patent Publication (Kokai) No. 61-48122. More recently, Yatsuka et al has taught in U.S. Pat. No. 5,009,960 that the presence of such multifunctional components in the resin containing the metal sulfonate group or metal salt of an acidic phosphorus compound for the purpose of improving the durability of such coating still results in a lesser dispersibility. Yatsuka et al further taught that the incorporation of a bicyclic amide acetal into the polyurethane resin will overcome the deficiencies of the prior art. A preferred polyurethane contains, as a functional group, a metal salt of an acidic phosphorus compound having the formula:

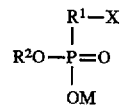

wherein M is an alkali metal atom; $R^1$ is a hydrocarbon group of 3 to 10 carbon atoms, X is an ester forming functional group, $R^2$ is an alkyl group of 1 to 12 carbon atoms, a cycloalkyl group of 6 to 12 carbon atoms, an aryl group of 6 to 12 carbon atoms which may contain a halogen atom, a hydroxyl group, an amino group, or an OM' group wherein M' is a metal atom.

SUMMARY OF THE INVENTION

In view of this, the present inventors have studied extensively with the object of improving the dispersibility of magnetic particles in the resinous binder while maintaining the mechanical properties of the binder in the coating. The present inventors have found that the bicyclic amide acetal group is not needed in a binder resin incorporating their particular phosphorus compound.

It is an object of their invention, therefore, to provide a resinous binder for ferromagnetic particles which has excellent dispersiblility of such particles but which may be free of bicyclic amide acetal groups.

It is another object of this invention to provide such a binder which also has a high glass transition temperature.

It is another object of their invention to provide a magnetic coating composition which has excellent dispersiblility of ferromagnetic particles and is free of vinyl chloride polymers and copolymers containing polar groups.

It is another object of their invention to provide a magnetic recording medium having such a coating.

It is still another object of this invention to provide a novel ionic phosphonate.

These and other objects of the invention which will become apparent from the following description are achieved by a binder resin containing a functional group having the formula:

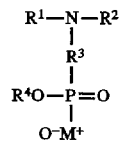

wherein $R^1$ and $R^2$ are the same or different oxyalkylene radicals having from 2 to 12 carbon atoms, $R^3$ is an alkylene radical having from 1 to 12 carbon atoms, or an aralkylene radical having from 7 to 10 carbon atoms, $R^4$ is an alkyl radical having from 1 to 12 carbon atoms, a cycloalkyl radical having from 5 to 12 carbon atoms, or an aryl radical having from 6 to 12 carbon atoms wherein the aryl radical may contain a halogen atom, a hydroxyl group, or an amino group, and M⁺ is a metal ion or ammonium ion.

DETAILED DESCRIPTION OF THE INVENTION

The binder resin of this invention is a polyurethane or a polyester. The magnetic coating composition of this invention may contain either or both of these and may further contain other binder resins such as those mentioned hereinabove.

The polyurethane resin of this invention is one having a weight average molecular weight of from 3000 to 150,000 obtained by the reaction of (A) a polyol having a molecular weight of from 300 to 5,000, (B) a chain extender having a molecular weight of less than 1000, and (C) a polyisocyanate. The polyurethane may be a segmented block or random copolymer comprising a hard segment and a soft segment. The aminoalkylphosphonate group of Formula I may be present in either or both of the segments.

The polyol (A) may be a polyesterdiol, a polyetherdiol, a polycarbonate diol, a polycaprolactone diol, or a mixture of two or all of them.

The carboxylic acid component of the polyesterdiol is exemplified by aromatic dicarboxylic acids such as terephthalic, isophthalic, orthophthalic or its anhydride, and 1,5-naphthalic acid; aromatic oxycarboxylic acids such as p-oxybenzoic acid p-(hydroxyethoxy)benzoic acid; aliphatic dicarboxylic acids such as succinic, adipic, azelaic, sebacic, and dodecanedioc acid; alicyclic dicarboxylic acids such as cyclohexanedicarboxylic acid, hydrogenated 2,6-naphthalenedicarboxylic acid and the like.

The glycol component of the polyesterdiol includes the N,N-bis(hydroxyalkyl)aminoalkyl phosphonates from which the functional groups of Formula I are derived. Other examples of the glycol component include ethylene glycol, propylene glycol, 1,3-propanediol, 1,4-butanediol, 1,5-pentanediol, 1,6-hexanediol, neopentyl glycol, diethylene glycol, dipropylene glycol, 2-methyl-1,3-propane diol; 2-butyl-2-ethyl-1,3-propane diol; 2,2,4-trimethyl-1,3-pentanediol; cyclohexanedimethanol, ethylene oxide and propylene oxide adducts of bisphenol A, ethylene oxide and propylene oxide adducts of hydrogenated bisphenol A, polyethylene glycol, polypropylene glycol, polytetramethylene glycol, and the like. The polyesterdiols that may be used in this invention are further exemplified by the polycaprolactone diols obtained by the ring opening polymerization of lactones such as e-caprolactone. Union Carbide's Tone 0260 is a commercial example of such a diol.

The polyesterdiol is produced by the conventional procedure in which the acid and hydroxyl group containing compound are heated in the presence of an acid catalyst until the acid number is reduced to about 10 or less.

The polyetherdiols are exemplified by the polyethylene glycols, polypropylene glycols, polytetramethylene glycols, and mixed poly(propylene/ethylene) glycols, particularly those having up to about 20% by weight of ethylene oxide units. All of said polyetherdiols are commercially available.

Polycarbonate diols are exemplified by those offered by PPG Industries, Inc., under the Duracarb trademark as the 120 series and the 140 series.

The ionic phosphonates, in particular, the N,N-bis (hydroxyalkyl)aminoalkyl phosphonates from which the functional groups of Formula I are derived, are made by a modified Mannich reaction of a dialkyl hydrogen phosphite with an N-N-bis-hydroxyalkylamine or hydroxyaralkylamine and an aldehyde, followed by the saponification of one of the phosphonate ester groups by a base. M⁺ is exemplified by the sodium, potassium, lithium, ammonium, alkylammonium and quaternary ammonium ions in salts of N,N-bis-(2-hydroxyethyl)aminomethyl phosphonate, N,N-bis-(3-hydroxypropyl) aminomethyl phosphonate, N,N-bis-(4-hydroxybutyl)aminomethyl phosphonate, N,N-bis-(4-hydroxybutyl)aminoethyl phosphonate, [N-(2-hydroxyethyl), N-(3-hydroxypropyl)]aminoethyl phosphonate, and [N-(2-hydroxyethyl), N-(3-hydroxypropyl)]aminomethyl phosphonate.

Trifunctional components such as trimellitic anhydride, trimethylolpropane, glycerin, and the like may be used in combination with the difunctional acids and glycols; but care must be taken in the formulation of binder resins for magnetic media to preserve good performance thereof.

Thus, the polyurethane resin of this invention may have a polyester, polyether or polycarbonate backbone or a combination thereof. The chain extender (B) has the effect of regulating the urethane group content of the polyurethane resin to impart toughness to the resin. Examples of the chain extender include straight chain glycols such as ethylene glycol; 1,3-propylene glycol; 2-methyl-1,3-propane diol; 2-butyl-2-ethyl-1,3-propane diol; 1,4-tetramethylene glycol; 1,6-hexanediol, cyclohexanedimethanol, xylylene glycol, diethylene glycol; triethylene glycol; and an ethylene oxide adduct of bisphenol A; branched chain glycols such as propylene glycol; neopentyl glycol; 1,2-butanediol; 1,3-butanediol; 2,2,4-trimethyl-1,3-pentanediol; and a propylene oxide adduct of bisphenol A; water; aminoalcohols such as monoethanolamine and N-methylethanolamine; diamines such as ethylene diamine, hexamethylene diamine, and isophorone diamine are suitable in some instances, but to avoid crosslinking, secondary diamines such as N,N'-dialkyl phenylenediamine; p,p'-di(alkylamino)diphenylmethane; piperazine and the like are preferred. The amount of chain extender is determined in part by the size and nature of the chain extender and in part by the desired properties. Trifunctional chain extenders such as trimethylolpropane, diethanolamine, triethanolamine, and glycerin may also be used with care as to their effect on the performance characteristics of the polyurethane.

Polyisocyanate (C) is exemplified by 2,4-tolylene diisocyanate; 2,6-tolylenediisocyanate; p-phenylenediisocyanate; diphenylmethanediisocyanate or MDI; m-phenylene diisocyanate; hexamethylenediisocyanate; tetramethylenediisoacyanate; 3,3'dimethoxy-4,4'-biphenylenediisocyanate; 2,4-naphthalene diisocyanate;3, 3'-dimethyl-4,4'-biphenylenediisocyanate; 4,4'diphenylenediisocyanate; 4,4'-diisocyanate-diphenyl ether, 1,5-naphthalenediisocyanate; p-xylylenediisocyanate; m-xylylene diisocyanate; 1,3-diisocyanatomethylcyclohexane; 1,4-diisocyanatomethylcyclohexane; 4,4'-diisocyanatodicyclohexane; 4,4'-diisocyanatodicyclohexylmethane; isophorone diisocyanate; and the like. Triisocyanates, such as 2,4-tolylenediisocyanate trimer and hexamethylenediisocyanate trimer and the like, are also used with care as to their effect on the performance characteristics of the polyurethane.

In producing the polyurethane resin used in the present invention, the molar ratio of the isocyanate to hydroxyl is in the range of 1:2 to 1:1. Said ratio is a factor in determining the molecular weight of the resin. When the isocyanate content is too large, the resulting polyurethane is isocyanate-terminated and has a poor storage life. When the hydroxyl content is too large, the molecular weight decreases. A preferred range for the ratio of NCO/OH equivalents is from 1:1 to 1:1.2. A preferred weight average molecular weight range for the polyurethane resin is from 3000 to 150,000. When it is less than 3000, the mechanical strength of the polyurethane suffers; when it exceeds 150,000, the solution viscosity makes handling increasingly difficult.

The polyaddition reaction for producing the polyurethane of this invention may be of the one-shot procedure wherein all of the components are reacted at one time, or of the prepolymer method wherein a long chain diol is first reacted with excess isocyanate and the resulting isocyanate-terminated prepolymer is polymerized using a chain extender. The reaction may be carried out in either the molten state or in solution. The temperature is suitably about 120° C. and the time is generally about 90 minutes. The block polymer method is a variation on the prepolymer method wherein another long chain hydroxyl group containing compound is reacted with the isocyanate-terminated prepolymer. Stannous octoate, stannous oxalate, dibutyltin dilaurate, triethylamine, and the like may be used as a catalyst. Ultraviolet light absorbers, hydrolysis inhibitors, antioxidants, and other useful additives may be added before, during, or after the production of the polyurethane.

The polyester resin used as a binder resin in the magnetic coating composition of this invention may be like the polyesterdiol (A) except that its weight average molecular weight is from 3000 to 150,000.

The polyol (A) used in the preparation of the polyurethane resin of this invention and the polyester resin which is, itself, used as a binder resin in this invention both contain a sufficient amount of the aminoalkyl phosphonate salt which furnishes the functional group of Formula I to yield a binder having a phosphonate salt concentration of from about 5 to about 1000 gram equivalents per $1 \times 10^6$ grams of polymer.

The ferromagnetic particles used in the coating composition of the present invention include magnetic metal powders such as iron, metal oxides such as $\gamma$-$Fe_2O_3$, $\gamma$-$Fe_2O_3$/$Fe_3O_4$ mixed crystal, $CrO_2$, and cobalt-containing iron oxide; ferromagnetic alloy powders such as Fe—Co and Fe—Co—Ni; and barium ferrite. A suitable magnetic particle/binder ratio is about 3.5:1 by weight. Pigments such as carbon black, and abrasives such as alumina, green chrome, and $\alpha$-$Fe_2O_3$ may also be present in the coating composition. The particle size of each is from 0.01 to 2μ.

A solvent is generally used in the production of a magnetic coating composition of this invention. Ketones such as methyl ethyl ketone, methyl isobutyl ketone, and cyclohexanone; esters such as methyl acetate, ethyl acetate, and ethyl butyrate; glycol ethers such as ethylene glycol monoethyl ether; toluene, xylene; tetrahydrofuran, and mixtures of two or more of the preceding solvents are examples of those that are useful.

Plasticizers, lubricants, dispersing agents, antistatic agents and other additives may be added to the magnetic coating composition. Dibutyl phthalate and triphenyl phosphate exemplify the plasticizers. Dioctyl-sulfosodium succinate, t-butylphenol polyethylene ether, sodium ethylnaphthalenesulfonate, dilauryl sulfate, zinc stearate, soybean oil lecithin, myristic acid, butyl myristate and silicone oil exemplify the lubricants, antistatic agents, and dispersing agents.

The magnetic recording medium of this invention comprises a non-magnetic support and a magnetic coating formed thereon by applying the magnetic coating composition containing magnetic particles dispersed in the binder described above to the support and drying it. Material for the support includes polyesters, polypropylene, cellulose triacetate, polycarbonate, poly(vinylchloride), and aluminum. Examples of suitable films of polyethylene terephthalate are described in U.S. Pat. Nos. 4,454,312; 4,595,715; and 4,693,932, all of which are incorporated herein by reference.

Among the devices for dispersing the components of the magnetic coating composition there may be mentioned a ball mill, pebble mill, sand mill and high speed stone mill.

Methods for coating are exemplified by the knife coating, wire bar coating, doctor blade coating, reverse roll coating, and calender coating, and gravure methods. After the magnetic coating has been coated onto the non-magnetic support surface, the coated film is generally subjected before drying to an orienting treatment in a magnetic field and to a smoothing treatment. The magnetic coating layer is from about 1 micron to about 12 microns thick and provides a magnetic field of from about 600 to 5000 gauss.

The binder resin of the present invention becomes a uniform resin superior in dispersibility of magnetic particles by virtue of the incorporation of the aminoalkyl phosphonate salt described herein. As a result, the magnetic recording medium of this invention, the binder of which includes at least one of the aminoalkyl phosphonate modified resins of this invention, is superior in the filling characteristics and orientation of the magnetic particles and the smoothness of the magnetic layer of the recording medium.

The binder resins and magnetic coating compositions of this invention are illustrated specifically in the following examples wherein all parts are parts by weight unless otherwise indicated. Magnetic recording media of this invention are made by adding a cross-linking agent such as a trifunctional polyisocyanate to the magnetic coating composition, placing it on a support tape, drying it, and curing it in a conventional manner.

The invention is illustrated more specifically by the following examples wherein all parts are by weight unless otherwise indicated. All viscosities were measured by the Brookfield method with a #2 spindle at 20 rpm and 25° C. unless otherwise indicated. Gloss was measured at an angle of 60°.

EXAMPLE 1

Monosodium ethyl-N,N-bis(hydroxyethyl) aminomethyl phosphonate

This intermediate was prepared by adding 256 parts of diethyl-N,N-bis(hydroxyethyl)aminomethyl phosphonate to a 14% by weight solution of sodium hydroxide in water in a stirred reactor equipped with a distillation column and heating the mixture slowly to cause distillation of by-product ethanol to begin. The column temperature was maintained at 72°–75° C. and the reactor temperature was maintained at 80° C. until distillation stopped. The pH of the cooled product was 10.1 and the percent solids was 51.7.

EXAMPLE 2

Alternatively, the sodium ethyl-N,N-bis (hydroxyethyl) aminomethyl phosphonate (hereinafter called HAP) was made by heating a mixture of 849.5 parts of cyclohexanedimethanol (CHDM), 129.2 parts of deionized water, and 448.2 parts of the diethyl phosphonate of Example 1 in a reactor fitted with a condensation collecting column, a thermometer, and an addition funnel to 60°–65° C. and adding 167.8 parts of a 42.6% by weight solution of NaOH at a rate of about 60–80 drops/minute. The temperature was thus maintained in the 70°–75° C. range over a period of 50 minutes. Shortly after the completion of the NaOH addition, the temperature dropped to 72° C. The by-product ethanol and the solvent water were removed by distillation to give a mixture containing CHDM and 36% by weight of the phosphonate of this invention.

EXAMPLE 3

A first polyester having an OH number of 205 and made by the reaction of 42.5 parts of CHDM, 20.2 parts of 2-butyl-2-ethyl-1,3-propane diol (BEPD), and 37.2 parts of adipic acid was blended with a second polyester having an OH number of 195 and made from 42.1 parts of CHDM, 20.0 parts of BEPD, and 37.9 parts of adipic acid. The OH number of the resulting blend of "hard" polyesters was 198. Two "soft" polyesters were also mixed to give a second blend having an OH number of 198. The first "soft" polyester had an OH number of 195 and was made from 30 parts of butanediol (BD), 23 parts of BEPD, and 47 parts of adipic acid. The second "soft" polyester had an OH number of 205 and was made from 30.3 parts of BD, 23.1 parts of BEPD, and 46.6 parts of adipic acid. A 50% by weight solution of HAP in ethylene glycol was mixed,in turn, with a 70/30 mixture of the "hard" and "soft" blends to extend the OH number to 250. The weight percentages of each component were: 66.09% of the hard polyester, 28.32 of the soft polyester, and 5.59% of the glycol solution of the phosphonate of this invention. Seven hundred parts of this mixture and 379.2 parts of diphenylmethane-4,4'-diisocyanate (MDI) were mixed and reacted at 120° C. for 90 minutes to give a polyurethane of this invention. A 15% by weight solution of this polyurethane in methyl ethyl ketone had a viscosity of 188 cps.

EXAMPLE 4

Preparation of Polyester Containing HAP

The general procedure of Example 2 was followed to make a mixture of HAP and CHDM except that 566.3 parts (3.9 moles) of molten CHDM, 298.8 parts (1.2 moles) of the phosphonate, 86.0 parts of water, and 111.9 parts of the NaOH solution were used, 10.0 parts of Irganox 1076 inhibitor were added, and a nitrogen purge was used to help the removal of ethanol and water. Then, an additional 1249.3 parts of CHDM were added and the temperature was raised to 80°–90° C. whereupon 1169.2 parts (8.0 moles) of adipic acid were added. Heating was continued using an oil bath taking care that the maximum temperature differential between the bath and the reaction mixture was 35° C. As soon as distillation began, the nitrogen purging was stopped and the reaction mixture was heated to a maximum of 195°–200° C. where it was held for five hours. The pressure was then reduced to about 45–50 mm Hg and the reaction mixture was held for one hour at 195°–200° C. The column temperature was held at 50° C. The condensation was completed by adding 0.25 part of stannous oxalate and reducing the pressure still further to 20–25 mm Hg while holding the temperature at 195°–200° C. until the acid number was less than 1. The OH number of the product was 187.9.

The procedure was repeated except that the second charge of CHDM was 9.7 moles. The acid number was 0.78 and the OH number was 214.1.

Preparation of Polyurethane/polyurea

A blend of the polyesters having the OH values of 187.9 and 214.1 was made to achieve an OH value of 198. A portion (38.9 parts) of the blend was then mixed with two other polyesters having an OH value of 198: a CHDM/MP Diol/Adipic acid polyester (155.5 parts) and an MP Diol/Adipic acid polyester (194.4 parts). MP Diol is 2-methyl-1,3-propane diol. To this blend there was added 78 parts of N,N'-dibutyl phenylenediamine and the mixture was reacted with 252.2 parts of MDI. The viscosity of a 15% by weight solution of it in methyl ethyl ketone (MEK) was 20 cps and a 15% by weight solution in a MEK/cyclohexanone(CHO) /toluene mixture (1:1:1)$_w$ had a viscosity of 32 cps.

EXAMPLE 5

The blend of phosphonated polyesters of Example 4 was combined with the MP Diol/Adipic acid polyester of that example in a 15:85 weight ratio and MP Diol was added as a chain extender. The amounts of each component were 199.5, 1130.9, and 69.6 parts, respectively. To this mixture there was added 759.3 parts of MDI and the reaction was carried out in 90 minutes. A 15% solution of the polyurethane in MEK had a viscosity of 24 cps and at 20% solids, the viscosity was 62 cps. A 15% solution of the polyurethane in a MEK/CHO/toluene mixture (1:1:1)$_w$ had a viscosity of 40 cps.

EXAMPLE 6

The general procedure of Example 5 was followed except that the amount of MDI was reduced to 754.4 parts. The viscosities of the solutions were 34 cps, 100 cps, and 58 cps, respectively.

EXAMPLES 7 & 8

Magnetic Coating Compositions

A Binder Solution containing 181 parts of the sodio-sulfo copolymer of vinyl chloride, vinyl alcohol, and vinyl acetate sold under the trademark Zeon MR-110 by Nippon Zeon, in a solvent consisting of 341.8 parts each of MEK, CHO, and toluene was prepared for use in the millbase having the formulation shown in Table 1.

TABLE 1

| COMPONENT | WEIGHT |
|---|---|
| Cobalt-modified iron oxide (Auvico AX 2000) | 1900.0 |
| Carbon black (Mogul L) | 152.0 |
| Aluminum oxide (Norton) | 38.0 |
| Methyl ethyl ketone | 635.8 |
| Cyclohexanone | 496.1 |
| Toluene | 635.8 |
| Myristic acid | 14.3 |
| Binder Solution (15% total solids) | 1206.4 |

A KDL pilot mill was used to mill the millbase formulation. Before milling the Brookfield viscosity was 5500 using a #6 spindle at 20 rpm. After milling, it was 12600.

Polyurethane Solutions A and B containing 271.4 parts of the product of Example 5 and the product of Example 6, respectively, were prepared in a solvent consisting of 512.7 parts each of MEK, CHO, and toluene for use in the formulation of letdowns for making the magnetic coating compositions of Examples 7 and 8 as follows:

To each of said Polyurethane Solutions, there were added 109.4 parts of MEK, 20.5 parts of CHO, 109.4 parts of toluene, and 14.25 parts of butyl myristate to make Letdown Solutions C and D.

The magnetic coating compositions of Examples 7 and 8 were made by letting down the millbase with Letdown Solutions C and D, respectively, using a letdown factor of 40.63 parts per 100 parts of millbase.

EXAMPLE 9 and Comparative Example 1

A millbase binder of this invention was prepared as follows:

To 566.3 parts (3.9 moles) of molten CHDM there were added 608.3 parts of the solution of the sodium phosphonate of Example I, 0.25 part of stannous oxalate catalyst, and 1169.2 parts of adipic acid. The temperature was held at 195°–200° C. until the distillation of water stopped. Then, after cooling the reaction mixture to 140°–150° C., an additional 1249.3 parts of CHDM were added and the temperature was raised to 195°–200° C. again. When the distillation stopped again, the pressure was reduced to 45–50 mm Hg and the reaction was continued for one hour at the same temperature while maintaining the column temperature at 50° C. to minimize loss of CHDM. A second charge of 0.5 part of the catalyst was then added, the pressure was reduced to 20–25 mm Hg and the reaction was completed at 195–200 as indicated by an acid number of about one. The OH number was 189.6.

Preparation of a polyurethane of this invention

A first polyester having an OH number of 205 made from a reaction mixture composed of, by weight, 42.5% CHDM, 20.2% BEPD, and 37.2% adipic acid and a second polyester having an OH number of 195 made from a reaction mixture having the same components but in the ratio 42.1:20.0:37.9 were mixed to obtain a blend having an OH number of 198. A mixture of 868.8 parts of the phosphonated polyester described above, 372.4 parts of said polyester blend, and 158.8 parts of BEPD was reacted with 738.1 parts of MDI to form a polyurethane of this invention. Molecular weight determinations showed the product to have a $MW_w$ of 18,800; a $MW_n$ of 7200, and a $MW_z$ of 32,000. The viscosity of a 15% solution in MEK was 420 cps. At the same concentration in MEK/CHO/toluene $(1:1:1)_w$, the viscosity was 142 cps.

Comparative Example 1

A binder of the prior art, the sodio- sulfocopolymer of vinyl chloride, vinyl alcohol, and vinyl acetate sold under the trademark Zeon MR-110 by Nippon Zeon.

Binder Solutions

A solution of the above-described polyurethane of this invention and a solution of the binder of Comparative Example 1 were each prepared by dissolving 95.4 parts of the binder in a solvent mixture containing 179.9 parts each of MEK, CHO, and toluene.

Millbase Constructions

The binder solutions were used in the millbase formulations shown in Table 2.

TABLE 2

| COMPONENT | WEIGHT |
|---|---|
| Cobalt-modified iron oxide (Auvico AX 2000) | 1000.0 |
| Carbon black (Mogul L) | 80.0 |
| Aluminum oxide (Norton) | 20.0 |
| Methyl ethyl ketone | 334.6 |
| Cyclohexanone | 261.1 |
| Toluene | 334.6 |
| Myristic acid | 7.5 |
| Binder Solution (15% Solids) | 634.9 |

The Brookfield viscosity of the millbase formulation of Example 9 before being milled was 4100 cps using a #6 spindle at 20 rpm and 74° F. After milling in a KDL pilot mill, it was 8750 cps.

The Brookfield viscosity of the millbase formulation of Comparative Example 1 before being milled was 4950 cps using a #6 spindle at 20 rpm. After milling in a KDL pilot mill, it was 7550 cps.

The dispersive power (expressed in terms of gloss), coercivity (Hc), squareness ratio (SR), and switching field distribution (SFD) of the millbase of Example 9 after five passes through a sand mill are shown in Table 3.

TABLE 3

| Pass | MB | Gloss | Hc | SR | SFD |
|---|---|---|---|---|---|
| 1 | 9 | 53 | 740 | 0.79 | 0.42 |
|   | CE1 | 51 | 739 | 0.77 | 0.44 |
| 2 | 9 | 91 | 747 | 0.81 | 0.41 |
|   | CEI | 88 | 749 | 0.81 | 0.40 |
| 3 | 9 | 103 | 748 | 0.82 | 0.40 |
|   | CE1 | 92 | 743 | 0.81 | 0.40 |
| 4 | 9 | 108 | 746 | 0.81 | 0.40 |
|   | CE1 | 96 | 741 | 0.81 | 0.40 |
| 5 | 9 | 110 | 748 | 0.82 | 0.40 |
|   | CE1 | 99 | 740 | 0.81 | 0.40 |

EXAMPLE 10

To 566.3 parts (3.9 moles) of molten CHDM there were added 608.3 parts of the solution of the sodium phosphonate of Example I, 0.25 part of stannous oxalate catalyst, and 1169.2 parts of adipic acid. The temperature was held at 195°–200° C. until the distillation of water stopped. Then, after cooling the reaction mixture to 140°–150° C., an additional 1249.3 parts of CHDM were added and the temperature was raised to 195°–200° C. again. When the distillation stopped again, the pressure was reduced to 45–50 mm Hg and the reaction was continued for one hour at the same temperature while maintaining the column temperature at 50° C. to minimize loss of CHDM. A second charge of 0.5 part of the catalyst was then added, the pressure was reduced to 20–25 mm Hg and the reaction was completed at 195–200 as indicated by an acid number of about one. The OH number was 189.6.

Preparation of polyurethane

A mixture of 620.6 parts of the phosphonated polyester thus made, 620.6 parts of a polyester of MP Diol/adipic acid having an OH number of 194.7, and 158.9 parts of BEPD was reacted with 758.4 parts of MDI to form a polyurethane of this invention. A determination of its molecular weight gave a $MW_w$ of 20,431, a $MW_n$ of 8888, and a $MW_z$ of 33,351. The viscosity of a 15% solution in MEK was 25 cps. At the same concentration in MEK/CHO/toluene $(1:1:1)_w$, the viscosity was 44 cps.

EXAMPLE 11

A first polyester having an OH number of 195 and made from a reaction mixture composed of 30% by weight of butanediol, 23% of BEPD, and 47% of adipic acid was blended with a second polyester having an OH number of 205 made from a reaction mixture composed of 30.3% of butanediol, 23.1% of BEPD, and 46.6% of adipic acid to give a polyester blend having an OH number of 198.

A mixture of 625.8 parts of the blend and 625.8 parts of the phosphonated polyester described in Example 10, and 154.8 parts of BEPD was reacted with 758.5 parts of MDI to give another polyurethane of this invention. A determination of its molecular weight gave a $MW_w$ of 21,691, a $MW_n$ of 7563, and a $MW_z$ of 38,123. The viscosity of a 15% solution in MEK was 1200 cps. At the same concentration in the 1:1:1 solvent, the viscosity was 162 cps.

Comparative Example 2

This is a binder of the prior art, Morthane CA-398 polyurethane, sold by Morton International, Inc. It is free of functional groups and its weight average molecular weight is 73,800 and the number average molecular weight is 29,500.

EXAMPLES 12–16

Letdown solutions of the binders of Examples 10 and 11 and Comparative Example 2 were made according to the following formulation:

| | |
|---|---|
| MEK | 327.4 |
| CHO | 280.6 |
| TOL | 327.4 |
| BuMyr* | 7.5 |
| Binder | 142.9 |
| | 1085.8 |

*BuMyr = butyl myristate

The millbases of Example 9 and Comparative Example 1 were each letdown with 40.6 parts of these solutions per 100 parts of millbase. The magnetic oxide:binder ratio was 3.50:1. The letdown compositions were deposited on strips of 36 μm thick polyethylene terephthalate film so that the coating was 4 μm thick after drying. The compositions of this invention and of the prior art are identified as follows:

| | |
|---|---|
| 12 | millbase of Comp. Ex. 1 + Letdown of Ex. 10 |
| 13 | millbase of Ex. 9 + Letdown of Ex. 10 |
| 14 | millbase of Ex. 9 + Letdown of Comp. Ex. 2 |
| 15 | millbase of Comp. Ex. 1 + Letdown of Ex. 11 |
| 16 | millbase of Ex. 9 + Letdown of Ex. 11 |

The properties of said compositions are shown in Table 4, wherein the viscosities are shown as V Im (immediate) and V Ov (overnight), the dispersive power of the binder is expressed in terms of gloss, coercivity is $H_c$, squareness ratio is SR, and switching field distribution is SFD. Coercivity is the amount of externally applied magnetic strength necessary to reduce the magnetism of the ferromagnetic particles to zero. Squareness ratio is the ratio of residual magnetic flux to saturated magnetic flux. The switching field distribution is a measure of the population of particles that switch polarities at a given magnetic strength. The viscosities were taken with a #4 spindle at 50 rpm at room temperature.

TABLE 4

| Ex. | Gloss | Hc | SR | SFD | V Im | V Ov |
|---|---|---|---|---|---|---|
| 12 | 106 | 741 | 0.81 | 0.41 | 892 | 932 |
| 13 | 110 | 750 | 0.80 | 0.41 | 944 | 980 |
| 14 | 90 | 752 | 0.78 | 0.42 | 1350 | 1740 |
| 15 | 102 | 742 | 0.81 | 0.41 | 1480 | 1550 |
| 16 | 106 | 749 | 0.79 | 0.42 | 1700 | 1640 |

Millbases of this invention containing ferromagnetic metal particles were prepared as follows:

EXAMPLE 17

To 566.3 parts (3.9 moles) of molten CHDM there were added 608.3 parts of the solution of the sodium phosphonate of Example 1, 0.25 part of stannous oxalate catalyst, and 1169.2 parts of adipic acid. The temperature was held at 195°–200° C. until the distillation of water stopped. Then, after cooling the reaction mixture to 140°–150° C., an additional 1249.3 parts of CHDM were added and the temperature was raised to 195°–200° C. again. When the distillation stopped again, the pressure was reduced to 45–50 mm Hg and the reaction was continued for one hour at the same temperature while maintaining the column temperature at 50° C. to minimize loss of CHDM. A second charge of 0.5 part of the catalyst was then added, the pressure was reduced to 20–25 mm Hg and the reaction was completed at 195–200 as indicated by an acid number of 0.99. The OH number was 187.9

A second phosphonate containing polyester was made according to the same general procedure except that 1393.5 parts of CHDM made up the second charge. The acid number was 0.78 and the OH number was 214.1.

A blend containing 61.4 percent the first of these phosphonated polyesters and 38.6 percent the second was made to obtain a polyester having an OH number of 198.

Preparation of a polyurethane of this invention

A mixture of 665.3 parts of the phosphonated polyester blend, 665.3 parts of polyester made from 2-methyl-1,3-propanediol and adipic acid and having an OH number of 198, and 69.6 parts of 2-methyl-1,3-propanediol was reacted with 763.3 parts of MDI for 95 minutes to give a polyurethane of this invention. A 15% by weight solution of the polyurethane in a solvent containing equal weights of MEK, CHO, and toluene had a viscosity of 270.

Comparative Example 3

The binder used for comparative purposes was the Zeon MR-110 vinyl chloride/vinyl acetate/vinyl alcohol copolymer.

Binder Solutions

Solutions of the above-described polyurethane binder of this invention, of Example 9, and of the vinyl binder of the prior art were prepared by dissolving 150.0 parts of the binder in a solvent mixture containing 340 parts each of MEK and tetrahydrofuran, and 170 parts of toluene.

Millbase Constructions

The binder solutions were used in the millbase formulation shown in Table 5.

TABLE 5

| COMPONENT | WEIGHT |
| --- | --- |
| Kanto Denka P1100B iron | 1000.0 |
| Carbon black (Regal 500 R) | 20.0 |
| Aluminum oxide (Norton) | 60.0 |
| Methyl ethyl ketone | 486.7 |
| THF | 486.7 |
| Toluene | 243.3 |
| stearic acid | 10.0 |
| Binder Solution | 1000.0 |

The millbase concentrates were coated onto strips of 36 μm thick polyethylene terephthalate film so that the coating was 4 μm thick after drying so that the dispersive power, coercivity, squareness ratio, and switching field distribution of the millbases of Example 17, Example 9, and Comparative Example 3 after each of several passes through a sand mill could be measured. The results are shown in Table 6.

TABLE 6

| Pass | MB | Gloss | Hc | SR | SFD |
| --- | --- | --- | --- | --- | --- |
| 1 | Ex 9 | 98 | 1604 | 0.858 | 0.511 |
|  | Ex 17 | 86 | 1613 | 0.811 | 0.512 |
|  | C.E. 3 | 52 | 1604 | 0.813 | 0.524 |
| 2 | Ex 9 | 114 | 1590 | 0.828 | 0.501 |
|  | Ex 17 | 97 | 1619 | 0.830 | 0.504 |
|  | C.E. 3 | 58 | 1595 | 0.753 | 0.549 |
| 3 | Ex 9 | 118 | 1601 | 0.868 | 0.499 |
|  | Ex 17 | 99 | 1615 | 0.843 | 0.508 |
|  | C.E. 3 | 74 | 1583 | 0.779 | 0.542 |
| 4 | Ex 9 | 118 | 1606 | 0.868 | 0.501 |
|  | Ex 17 | 100 | 1615 | 0.853 | 0.511 |
|  | C.E. 3 | 75 | 1582 | 0.783 | 0.548 |
| 4 + | Ex 9 | 117 | 1592 | 0.835 | 0.523 |
| 1 hr | Ex 17 | 93 | 1608 | 0.806 | 0.549 |
|  | C.E. 3 | 53 | 1577 | 0.752 | 0.593 |

EXAMPLES 18–21

A series of ionic phosphonate-containing polyurethanes were made by the reaction of MDI with mixtures of MPD (2-methyl-1,3-propanediol) or BEPD (2-butyl-2-ethyl-1,3-propanediol), the phosphonated polyester blend (PPB), and the MPD/Adipic acid polyester (MPDA) of Example 17 wherein the weight ratio of PPB to the MPDA varied from 7:93 to 40:60. The parts by weight of the chain extenders, each polyester and of the MDI are given in Table 7 along with the viscosity of a 15% by weight solution of each polyurethane in an MEK/CHO/toluene $(1:1:1)_{wt}$ solvent mixture and the viscosity of such a solution of the polyurethane of Comparative Example 2.

TABLE 7

| Ex No. | PPB | MPDA | MPD | BEPD | MDI | Viscosity |
| --- | --- | --- | --- | --- | --- | --- |
| 18 | 93.1 | 1237.3 | 69.6 | — | 760.4 | 40 cps |
| 19 | 188.3 | 1066.7 | — | 145.0 | 761.3 | 48 cps |
| 20 | 399.1 | 931.3 | 69.6 | — | 753.2 | 58 cps |

TABLE 7-continued

| Ex No. | PPB | MPDA | MPD | BEPD | MDI | Viscosity |
| --- | --- | --- | --- | --- | --- | --- |
| 21 | 532.1 | 798.3 | 69.6 | — | 750.2 | 88 cps |
| CE 2 | — | — | — | — | — | 148 cps |

Millbase Comparison

Binder Solutions were made from 215.9 parts each of MEK, CHO, and toluene (TOL), and 114.3 parts of the binders of Examples 20 and 21 for the purpose of preparing millbase constructions according to the following formulation:

TABLE 8

| COMPONENT | WEIGHT |
| --- | --- |
| Cobalt-modified iron oxide (Auvico AX 2000) | 1200.0 |
| Carbon black (Mogul L) | 96.0 |
| Aluminum oxide (Norton) | 24.0 |
| Methyl ethyl ketone | 401.5 |
| Cyclohexanone | 313.3 |
| Toluene | 401.5 |
| Myristic acid | 9.0 |
| Binder Solution | 761.9 |

The Brookfield viscosity of the millbase of Example 20 before milling was 4550 cps and after six passes it was 12,900 cps (both with #6 spindle at 20 rpm).

The Brookfield viscosity of the millbase of Example 21 before milling was 2950 cps and after six passes it was 15,500 cps (both with #6 spindle at 20 rpm).

Each of the millbase solutions were passed through a KDL pilot mill several times and after each pass a sample was coated onto 36 μm thick polyethylene terephthalate film so that the dried coating was 4 μm thick.

The dispersive capacity, coercivity, squareness ratio, and switching field distribution of the coating on the film after each pass are given in Table 9.

TABLE 9

| Pass | MB | Gloss | HC | SR | SFD |
| --- | --- | --- | --- | --- | --- |
| 1 | 20 | 46 | 749 | 0.762 | 0.486 |
|  | 21 | 40 | 743 | 0.762 | 0.491 |
| 2 | 20 | 87 | 757 | 0.803 | 0.447 |
|  | 21 | 87 | 758 | 0.807 | 0.450 |
| 3 | 20 | 92 | 749 | 0.791 | 0.451 |
|  | 21 | 95 | 758 | 0.808 | 0.447 |
| 4 | 20 | 97 | 754 | 0.811 | 0.448 |
|  | 21 | 102 | 759 | 0.817 | 0.441 |
| 5 | 20 | 101 | 752 | 0.816 | 0.445 |
|  | 21 | 104 | 754 | 0.817 | 0.436 |
| 6 | 20 | 102 | 754 | 0.806 | 0.445 |
|  | 21 | 106 | 755 | 0.818 | 0.439 |
| 6 + | 20 | 94 | 729 | 0.746 | 0.508 |
| 24 hr | 21 | 97 | 741 | 0.752 | 0.501 |

EXAMPLES 22–25 and Comparative Example 4

Magnetic Recording Compositions

Letdown Constructions of each of the binders of Examples 18–21 were made by first dissolving 171.4 parts of the binder in a solvent made up of 323.8 parts each of MEK, CHO, and TOL and then diluting each solution by mixing 1142.9 parts of it with a solution made up of 69.1 parts of MEK, 13 parts of CHO, 69.1 parts of toluene, and 9 parts of butyl myristate. A millbase construction was prepared from the MR-110 binder according to the formula given in Table 8 above.

Magnetic recording compositions (MRC) of Examples 22–25 and of Comparative Example 4 prepared according to the formulation shown in Table 10 were coated onto strips of 36μ thick polyethylene terphthalate film so that the coating was 4μ thick after drying. The gloss and viscosity of the MRC's initially and after the period shown are given in Table 11. In like manner,the coercivity ($H_c$), squareness ratio (SR), and switching field distribution (SFD) are given in Table 12.

TABLE 10

| Ex No. | Millbase | LDC 18 | LDC 19 | LDC 20 | LDC 21 | LDC CE2 |
|---|---|---|---|---|---|---|
| 22 | 403.5 | 163.9 | — | — | — | — |
| 23 | 401.0 | — | 162.9 | — | — | — |
| 24 | 400.8 | — | — | 162.9 | — | — |
| 25 | 400.9 | — | — | — | 162.9 | — |
| CE 4 | 400.5 | — | — | — | — | 162.7 |

LCD = letdown construction

TABLE 11

| | Gloss | | Viscosity | | | | | |
|---|---|---|---|---|---|---|---|---|
| | | | Init | | 30 min | | 24 hrs | |
| | | | #6 @ | #4 @ | #6 @ | #4 @ | #6@ | #4 @ |
| MRC | Init | 24 hr | 20 | 50 | 20 | 50 | 20 | 50 |
| 22 | 108 | 107 | 2100 | 960 | 2500 | 1090 | 3000 | 1270 |
| 23 | 114 | 114 | 2200 | 1040 | 2750 | 1180 | 3150 | 1300 |
| 24 | 117 | 118 | 2550 | 1140 | 2950 | 1220 | 3150 | 1300 |
| 25 | 117 | 118 | 2900 | 1260 | 3150 | 1300 | 3300 | 1360 |
| CE4 | 102 | 97 | 3750 | 1770 | 5350 | 2240 | 6400 | 2720 |

TABLE 12

| | $H_c$ | | SR | | SFD | |
|---|---|---|---|---|---|---|
| MRC | Init | 24 hr | Init | 24 hrs | Init | 24 hrs |
| 22 | 767 | 759 | 0.818 | 0.802 | 0.427 | 0.454 |
| 23 | 764 | 751 | 0.822 | 0.788 | 0.427 | 0.454 |
| 24 | 762 | 747 | 0.819 | 0.794 | 0.435 | 0.458 |
| 25 | 762 | 745 | 0.830 | 0.792 | 0.440 | 0.461 |
| CE 4 | 759 | 751 | 0.813 | 0.779 | 0.441 | 0.487 |

The subject matter claimed is:

1. A polyester which incorporates a functional group having the formula:

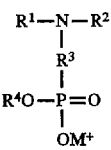

wherein $R^1$ and $R^2$ are the same or different oxyalkyl radicals having from 2 to 8 carbon atoms, $R^3$ is an alkylene radical having from 1 to 8 carbon atoms, $R^4$ is alkyl radical having from 1 to 12 carbon atoms, a cycloalkyl radical having from 5 to 12 carbon atoms, or an aryl radical having from 6 to 12 carbon atoms wherein the aryl radical may contain a halogen atom, a hydroxyl group, or an amino group, and M is a metal ion or an ammonium ion.

2. The resin of claim 1 wherein $R^1$ and $R^2$ are oxyethylene radicals.

3. The resin of claim 1 wherein $R^3$ is a methylene radical.

4. The resin of claim 1 wherein $R^4$ is an ethyl radical.

* * * * *